(12) United States Patent
Koskinen et al.

(10) Patent No.: US 12,477,441 B2
(45) Date of Patent: Nov. 18, 2025

(54) SYSTEM INFORMATION ACQUISITION FOR REDUCED CAPABILITY NR DEVICES

(71) Applicant: Nokia Technologies OY, Espoo (FI)

(72) Inventors: Jussi-Pekka Koskinen, Oulu (FI); Samuli Turtinen, Ii (FI); Ilkka Antero Keskitalo, Oulu (FI)

(73) Assignee: Nokia Technologies OY, Espoo (FI)

( * ) Notice: Subject to any disclaimer, the term of this patent is extended or adjusted under 35 U.S.C. 154(b) by 456 days.

(21) Appl. No.: 17/998,535

(22) PCT Filed: May 12, 2021

(86) PCT No.: PCT/IB2021/054073
§ 371 (c)(1),
(2) Date: Nov. 11, 2022

(87) PCT Pub. No.: WO2021/229478
PCT Pub. Date: Nov. 18, 2021

(65) Prior Publication Data
US 2023/0232314 A1    Jul. 20, 2023

Related U.S. Application Data

(60) Provisional application No. 63/024,008, filed on May 13, 2020.

(51) Int. Cl.
*G08C 17/00* (2006.01)
*H04W 48/10* (2009.01)
(Continued)

(52) U.S. Cl.
CPC ....... *H04W 48/10* (2013.01); *H04W 52/0216* (2013.01); *H04W 76/28* (2018.02); *H04W 36/08* (2013.01)

(58) Field of Classification Search
USPC .......................................... 370/311
See application file for complete search history.

(56) References Cited

U.S. PATENT DOCUMENTS

2010/0226342 A1* 9/2010 Colling ............... H04W 56/002
370/336
2013/0235776 A1* 9/2013 Park .................. H04W 52/0229
370/311

(Continued)

FOREIGN PATENT DOCUMENTS

WO    WO-2019101536 A1    5/2019

OTHER PUBLICATIONS

Sony: "System Information Area Scope and Value Tag", 3GPP Draft; R2-161140—Nbiot Sib, 3rd Generation Partnership Project (3GPP), Mobile Competence Centre ; 650, Route Des Lucioles ; F-06921 Sophia-Antipolis Cedex ; France, vol. RAN WG2, No. St. Julian's, Malta; Feb. 15, 2016-Feb. 19, 2016 , Feb. 14, 2016 (2016).

(Continued)

*Primary Examiner* — Chuong T Ho
(74) *Attorney, Agent, or Firm* — Lippes Mathias LLP

(57) ABSTRACT

A system, apparatus, method, and non-transitory computer readable medium for system information acquisition for reduced capability NR devices may include a UE device which is caused to, acquire first system information from a first cell, the first system information being applicable to a system information area; enter a sleep state of an extended sleep cycle mode for a desired time period in accordance with extended sleep cycle configuration information; enter an active state of the extended sleep cycle mode in response to expiration of the desired time period; select a second cell distinct from the first cell; determine whether to acquire second system information from the second cell, the second system information being applicable to the system informa- (Continued)

tion area; and acquire the second system information from the second cell based on the determining

14 Claims, 6 Drawing Sheets

(51) Int. Cl.
  *H04W 52/02* (2009.01)
  *H04W 76/28* (2018.01)
  *H04W 36/08* (2009.01)

(56) References Cited

U.S. PATENT DOCUMENTS

| | | | |
|---|---|---|---|
| 2016/0242231 A1* | 8/2016 | Vajapeyam | H04W 24/08 |
| 2016/0352782 A1* | 12/2016 | Patil | H04W 8/005 |
| 2017/0311290 A1 | 10/2017 | Adjakple et al. | |
| 2018/0049022 A1 | 2/2018 | Johansson et al. | |
| 2018/0234917 A1* | 8/2018 | Kim | H04W 72/23 |
| 2019/0223153 A1 | 7/2019 | Kim | |
| 2019/0320490 A1* | 10/2019 | Liu | H04W 24/10 |
| 2019/0364462 A1* | 11/2019 | Kim | H04W 36/00 |
| 2022/0053517 A1* | 2/2022 | Kim | H04L 1/1812 |

OTHER PUBLICATIONS

International Search Report for International Application No. PCT/IB2021/054073 dated Jul. 16, 2021.

* cited by examiner

SYSTEM INFORMATION ACQUISITION FOR REDUCED CAPABILITY NR DEVICES

CROSS-REFERENCE TO RELATED APPLICATIONS

This application is a national phase entry under 35 U.S.C. § 371 of PCT International Application No. PCT/IB2021/054073 which has an International filing date of May 12, 2021, which claims priority to U.S. Provisional Application No. 63/024,008, filed May 13, 2020, the entire contents of each of which are hereby incorporated by reference.

BACKGROUND

Field

Various example embodiments relate to methods, apparatuses, systems, and/or non-transitory computer readable media for system information acquisition for reduced capability user equipment devices.

Description of the Related Art

Currently, a $5^{th}$ generation mobile network (5G) standard, referred to as 5G New Radio (NR), is being developed to provide higher capacity, higher reliability, and lower latency communications than the 4G long term evolution (LTE) standard. One of the expected goals of the 5G standard is to provide these improved communication capabilities to new user equipment (UE) devices with reduced capabilities, lower on-device resources, less expensive devices, physically smaller devices, completely wireless devices (e.g., devices that are expected to operate without human intervention for extended periods of time), etc. These new types of UE devices may be referred to as NR-Light and/or reduced capability (REDCAP) UE devices, and their expected use cases may include for example, consumer Internet of Things (IoT) devices, massive industrial networks, smart city infrastructure, wearable devices, networked medical devices, autonomous devices, etc. These types of UE devices may operate for extended periods of time without human intervention (e.g., perform maintenance, replace or recharge an on-device battery, etc.), may have reduced processing power and/or memory storage, may have reduced battery storage capability due to having small form factors, may be integrated into machinery (e.g., heavy machinery, factory machinery, sealed devices, etc.), may be installed/located in hazardous environment or difficult to access environments, etc.

Therefore, it is desired goal of the 5G standard to provide these UE devices with access to a wireless network using reduced power, such as the ability to operate in an extended sleep cycle mode, an extended discontinuous reception (eDRX) mode, etc.

However, the current 5G standard does not define the protocol for allowing a UE device operating in eDRX mode, such as a NR-Light UE device, a REDCAP UE device, a delay tolerant UE device (e.g., may tolerate delayed access to a wireless network) etc., to successfully re-connect to a 5G wireless network, e.g., acquire and/or re-acquire system information for accessing a 5G wireless network, following wake-up from the eDRX mode, such as cases where the UE device is geographically moved to a service area of a new cell while the UE device is in sleep mode, the system information of a serving cell changes while the UE device is in sleep mode, a value tag for the system information of a cell wraps around to a first received value while the UE device is in sleep mode, and/or the UE device is handed-over to a new serving cell while in sleep mode, etc. In such circumstances, the UE device operating in eDRX mode will wake up and use system information which it acquired when it was last in the active state, which may be out-of-date, incorrect, applicable to a previous serving cell and inapplicable to the current serving cell, etc., and therefore the UE device may fail to successfully connect to the 5G wireless network.

Accordingly, an approach is desired that provides a method for successfully re-establishing connection and/or acquiring system information to a wireless network for a UE device operating in an extended sleep cycle mode.

SUMMARY

At least one example embodiment relates to a user equipment (UE) device including a memory storing computer readable instructions, and at least one processor configured to execute the computer readable instructions.

In at least one example embodiment, the UE device is caused to acquire first system information from a first cell, the first system information being applicable to a system information area; enter a sleep state of an extended sleep cycle mode for a desired time period in accordance with extended sleep cycle configuration information; enter an active state of the extended sleep cycle mode in response to expiration of the desired time period; select a second cell distinct from the first cell; determine whether to acquire second system information from the second cell, the second system information being applicable to the system information area; and acquire the second system information from the second cell based on the determining.

Some example embodiments of the UE device provide that the first system information includes a first system information area identifier of the system information area and a first value tag; and the second system information includes, a second system information area identifier matching the first system information area identifier, and a second value tag matching the first value tag.

Some example embodiments of the UE device provide that the UE device is further caused to receive a first cell identifier from the first cell prior to entering the sleep state; receive a second cell identifier from the second cell after entering the active state; determine whether to acquire the second system information from the second cell by comparing the first and second cell identifiers; and acquire the second system information from the second cell in response to the first cell identifier not matching the second cell identifier.

Some example embodiments of the UE device provide that the first system information includes a first system information area identifier; and the UE device is further caused to, determine whether to store the first system information area identifier in the memory based on the extended sleep cycle configuration information; determine whether to acquire the second system information from the second cell by determining whether a system information area identifier is stored in the memory; and acquire the second system information from the second cell in response to the memory not storing any system information area identifier.

Some example embodiments of the UE device provide that the first system information includes a first system information area identifier; and the extended sleep cycle configuration information further causes the UE device to, delete the first system information area identifier received from the first cell from the memory prior to entering the sleep state.

Some example embodiments of the UE device provide that the first system information includes a first value tag; and the UE device is further caused to, determine whether to store the first value tag in the memory based on the extended sleep cycle configuration information; determine whether to acquire the second system information from the second cell by determining whether a value tag is stored in the memory; and acquire the second system information from the second cell in response to the memory not storing any value tag.

Some example embodiments of the UE device provide that the first system information includes a first value tag; and the extended sleep cycle configuration information further causes the UE device to, delete the first value tag received from the first cell from the memory prior to entering the sleep state.

Some example embodiments of the UE device provide that the UE device is further caused to acquire the second system information from the second cell by at least one of: receiving at least one second broadcast message from the second cell, the at least one second broadcast message including the second system information; and transmitting a request to the second cell for the second system information, and receiving the second system information from the second cell in response to the transmitted request.

Some example embodiments of the UE device provide that the selecting the second cell includes at least one of: selecting or re-selecting the second cell as a new serving cell; synchronizing to the second cell; and connecting to the second cell upon handover from the first cell.

Some example embodiments of the UE device provide that the extended sleep cycle mode is an extended discontinuous reception (eDRX) mode.

Some example embodiments of the UE device provide that the first cell corresponds to a first radio access network (RAN) node and the second cell corresponds to a second RAN node.

At least one example embodiment relates to a user equipment (UE) device including a memory storing computer readable instructions, and at least one processor configured to execute the computer readable instructions.

In at least one example embodiment, the UE device is caused to acquire first system information from a first cell, the first system information being applicable to a system information area, receive extended sleep cycle configuration information corresponding to an extended sleep cycle mode, and determine whether to acquire second system information from a second cell based on the received extended sleep cycle configuration information, the second system information being applicable to the system information area.

Some example embodiments of the UE device provide that the first system information includes a first system information area identifier of the system information area and a first value tag; and the second system information includes, a second system information area identifier matching the first system information area identifier, and a second value tag matching the first value tag.

Some example embodiments of the UE device provide that the UE device is further caused to: determine whether to acquire the second system information from the second cell by determining whether a system information area identifier is stored in the memory; and acquire the second system information in response to the memory not storing any system information area identifier.

Some example embodiments of the UE device provide that the extended sleep cycle configuration information is received from the first cell, and further causes the UE device to: not store a first system information area identifier received from the first cell in the memory prior to entering a sleep state.

Some example embodiments of the UE device provide that the extended sleep cycle configuration information is received from the first cell, and further causes the UE device to: delete a first system information area identifier received from the first cell from the memory prior to entering a sleep state.

Some example embodiments of the UE device provide that the UE device is further caused to: determine whether to acquire the second system information from the second cell by determining whether a value tag is stored in the memory; and acquire the second system information in response to the memory not storing any value tag.

Some example embodiments of the UE device provide that the extended sleep cycle configuration information is received from the first cell, and further causes the UE device to: not store a first value tag received from the first cell in the memory prior to entering a sleep state.

Some example embodiments of the UE device provide that the extended sleep cycle configuration information is received from the first cell, and further causes the UE device to: delete a first value tag received from the first cell from the memory prior to entering a sleep state.

Some example embodiments of the UE device provide that the UE device is further caused to store the first system information received from the first cell in the memory prior to entering a sleep state of the extended sleep cycle mode; and the extended sleep cycle configuration information is received from the second cell, and further causes the UE device to acquire the second system information from the second cell.

Some example embodiments of the UE device provide that the UE device is further caused to acquire the second system information from the second cell by at least one of: receiving at least one second broadcast message from the second cell, the at least one second broadcast message including the second system information; and transmitting a request to the second cell for the second system information, and receiving the second system information from the second cell in response to the transmitted request.

Some example embodiments of the UE device provide that the extended sleep cycle mode is an extended discontinuous reception (eDRX) mode.

Some example embodiments of the UE device provide that the first cell corresponds to a first radio access network (RAN) node, and the second cell corresponds to a second RAN node.

At least one example embodiment relates to a user equipment (UE) device including a memory storing computer readable instructions, and at least one processor configured to execute the computer readable instructions.

In at least one example embodiment, the UE device is caused to receive extended sleep cycle configuration information corresponding to an extended sleep cycle mode, and determine whether to acquire system information from a cell based on the received extended sleep cycle configuration information, the system information being applicable to a system information area.

Some example embodiments of the UE device provide that determine whether to acquire the system information from the cell by determining whether a system information area identifier is stored in the memory; and acquire the system information in response to the memory not storing any system information area identifier.

Some example embodiments of the UE device provide that the extended sleep cycle configuration information further causes the UE device to perform at least one of: not storing a system information area identifier received from the cell in the memory prior to entering a sleep state of the extended sleep cycle mode; and deleting the system information area identifier received from the cell from the memory prior to entering a sleep state of the extended sleep cycle mode.

Some example embodiments of the UE device provide that the extended sleep cycle configuration information further causes the UE device to: unconditionally acquire system information from the cell after exiting a sleep state of the extended sleep cycle mode.

Some example embodiments of the UE device provide that the extended sleep cycle mode is an extended discontinuous reception (eDRX) mode.

At least one example embodiment relates to a radio access network (RAN) node including a memory storing computer readable instructions, and at least one processor configured to execute the computer readable instructions.

In at least one example embodiment, the RAN node is caused to transmit extended sleep cycle configuration information corresponding to an extended sleep cycle mode to a user equipment (UE) device served by a cell corresponding to the RAN node, wherein the extended sleep cycle configuration information causes the UE device to, operate in a sleep state of the extended sleep cycle mode for a desired time period, operate in an active state of the extended sleep cycle mode after expiration of the desired time period, and acquire system information after the UE device is in the active state.

Some example embodiments of the RAN node provide that the cell is a first cell selected by the UE device prior to entering the sleep state; and the RAN node is further caused to, transmit first system information to the UE device, the first system information being applicable to a system information area.

Some example embodiments of the RAN node provide that the cell is a second cell selected by the UE device after entering the active state; and the RAN node is further caused to, transmit second system information to the UE device.

Some example embodiments of the RAN node provide that the first system information includes a first system information area identifier of the system information area and a first value tag; the RAN node is further caused to, transmit a first cell identifier to the UE device prior to entering the sleep state; and the extended sleep cycle configuration information further causes the UE device to, receive a second cell identifier from a second cell after entering the active state, determine whether to acquire second system information from the second cell by comparing the first and second cell identifiers, and acquire the second system information from the second cell in response to the first cell identifier not matching the second cell identifier.

Some example embodiments of the RAN node provide that the second system information includes, a second system information area identifier matching a first system information area identifier transmitted by a first cell to the UE device prior to the UE device entering the sleep state, and a second value tag matching a first value tag transmitted by the first cell to the UE device prior to the UE device entering the sleep state; the extended sleep cycle configuration information further causes the at least one UE device to, receive a first cell identifier from the first cell prior to entering the sleep state, determine whether to acquire second system information from the second cell by comparing the first and second cell identifiers, and acquire the second system information from the second cell in response to the first cell identifier not matching the second cell identifier.

Some example embodiments of the RAN node provide that the first system information includes a first system information area identifier; the extended sleep cycle configuration information further causes the UE device to, determine whether to store the first system information area identifier in the UE device based on the extended sleep cycle configuration information, determine whether to acquire the second system information from a second cell after entering the active state by determining whether a system information area identifier is stored in the UE device, and acquire the second system information from the second cell in response to the UE device not storing any system information area identifier.

Some example embodiments of the RAN node provide that the first system information includes a first system information area identifier; and the extended sleep cycle configuration information further causes the UE device to, delete the first system information area identifier prior to entering the sleep state.

Some example embodiments of the RAN node provide that the first system information includes a first value tag; and the extended sleep cycle configuration information further causes the UE device to, determine whether to store the first value tag in the UE device based on the extended sleep cycle configuration information, determine whether to acquire second system information from a second cell after entering the active state by determining whether a value tag is stored in the UE device, and acquire the second system information from the second cell in response to the UE device not storing any value tag.

Some example embodiments of the RAN node provide that the first system information includes a first value tag; and the extended sleep cycle configuration information further causes the UE device to, delete the first value tag prior to entering the sleep state.

Some example embodiments of the RAN node provide that the extended sleep cycle mode is an extended discontinuous reception (eDRX) mode.

At least one example embodiment relates to a method of operating a user equipment (UE) device.

In at least one example embodiment, the method, performed by the UE device, includes acquiring first system information from a first cell, the first system information being applicable to a system information area; entering a sleep state of an extended sleep cycle mode for a desired time period in accordance with extended sleep cycle configuration information; entering an active state of the extended sleep cycle mode in response to expiration of the desired time period; selecting a second cell distinct from the first cell; determining whether to acquire second system information from the second cell, the second system information being applicable to the system information area; and acquiring the second system information from the second cell based on the determining.

At least one example embodiment relates to a method of operating a user equipment (UE) device.

In at least one example embodiment, the method, performed by the UE device, includes acquiring first system information from a first cell, the first system information being applicable to a system information area; receiving extended sleep cycle configuration information corresponding to an extended sleep cycle mode; and determining whether to acquire second system information from a second cell based on the received extended sleep cycle configuration information, the second system information being applicable to the system information area.

At least one example embodiment relates to a method of operating a user equipment (UE) device.

In at least one example embodiment, the method, performed by the UE device, includes receiving extended sleep cycle configuration information corresponding to an extended sleep cycle mode; and determining whether to acquire system information from a cell based on the received extended sleep cycle configuration information, the system information being applicable to a system information area.

At least one example embodiment relates to a user equipment (UE) device.

In at least one example embodiment, the UE device includes means for acquiring first system information from a first cell, the first system information being applicable to a system information area; entering a sleep state of an extended sleep cycle mode for a desired time period in accordance with extended sleep cycle configuration information; entering an active state of the extended sleep cycle mode in response to expiration of the desired time period; selecting a second cell distinct from the first cell; determining whether to acquire second system information from the second cell, the second system information being applicable to the system information area; and acquiring the second system information from the second cell based on the determining.

Some example embodiments of the UE device provide that the first system information includes a first system information area identifier of the system information area and a first value tag; and the second system information includes, a second system information area identifier matching the first system information area identifier, and a second value tag matching the first value tag.

Some example embodiments of the UE device provide that the UE device includes means for receiving a first cell identifier from the first cell prior to entering the sleep state; receiving a second cell identifier from the second cell after entering the active state; determining whether to acquire the second system information from the second cell by comparing the first and second cell identifiers; and acquiring the second system information from the second cell in response to the first cell identifier not matching the second cell identifier.

Some example embodiments of the UE device provide that the first system information includes a first system information area identifier; and the UE device includes means for, determining whether to store the first system information area identifier in the memory based on the extended sleep cycle configuration information; determining whether to acquire the second system information from the second cell by determining whether any system information area identifier is stored in the memory; and acquiring the second system information from the second cell in response to the memory not storing any system information area identifier.

Some example embodiments of the UE device provide that the first system information includes a first system information area identifier; and the UE device includes means for, deleting the first system information area identifier received from the first cell from the memory prior to entering the sleep state.

Some example embodiments of the UE device provide that the first system information includes a first value tag; and the UE device includes means for, determining whether to store the first value tag in the memory based on the extended sleep cycle configuration information; determining whether to acquire the second system information from the second cell by determining whether a value tag is stored in the memory; and acquiring the second system information from the second cell in response to the memory not storing any value tag.

Some example embodiments of the UE device provide that the first system information includes a first value tag; and the UE device includes means for, deleting the first value tag received from the first cell from the memory prior to entering the sleep state.

Some example embodiments of the UE device provide that the UE device includes means for acquiring the second system information from the second cell by at least one of: receiving at least one second broadcast message from the second cell, the at least one second broadcast message including the second system information; and transmitting a request to the second cell for the second system information, and receiving the second system information from the second cell in response to the transmitted request.

Some example embodiments of the UE device provide that the selecting the second cell includes at least one of: selecting or re-selecting the second cell as a new serving cell; synchronizing to the second cell; and connecting to the second cell upon handover from the first cell.

Some example embodiments of the UE device provide that the extended sleep cycle mode is an extended discontinuous reception (eDRX) mode.

Some example embodiments of the UE device provide that the first cell corresponds to a first radio access network (RAN) node and the second cell corresponds to a second RAN node.

At least one example embodiment relates to a radio access network (RAN) node includes means for transmitting extended sleep cycle configuration information corresponding to an extended sleep cycle mode to a user equipment (UE) device served by a cell corresponding to the RAN node, wherein the extended sleep cycle configuration information causes the UE device to, operate in a sleep state of the extended sleep cycle mode for a desired time period, operate in an active state of the extended sleep cycle mode after expiration of the desired time period, and acquire system information after the UE device is in the active state.

Some example embodiments of the RAN node provide that the cell is a first cell initially selected by the at least one UE device; and the RAN node includes means for, transmitting first system information to the at least one UE device, the first system information being applicable to a system information area.

Some example embodiments of the RAN node provide that the cell is a second cell selected by the at least one UE device; and the RAN node includes means for, transmitting second system information to the at least one UE device.

Some example embodiments of the RAN node provide that the first system information includes a first system information area identifier of the system information area and a first value tag; the RAN node includes means for, transmitting a first cell identifier to the UE device prior to entering the sleep state; and the extended sleep cycle configuration information further causes the UE device to, receive a second cell identifier from a second cell after entering the active state, determine whether to acquire second system information from the second cell by comparing the first and second cell identifiers, and acquire the second system information from the second cell in response to the first cell identifier not matching the second cell identifier.

Some example embodiments of the RAN node provide that the second system information includes, a second system information area identifier matching a first system information area identifier transmitted by a first cell to the UE device prior to the UE device entering the sleep state, and a second value tag matching a first value tag transmitted by the first cell to the UE device prior to entering the sleep state; and the extended sleep cycle configuration information further causes the UE device to, receive a first cell identifier from the first cell prior to entering the sleep state, determine whether to acquire second system information from the second cell by comparing the first and second cell identifiers, and acquire the second system information from the second cell in response to the first cell identifier not matching the second cell identifier.

Some example embodiments of the RAN node provide that the first system information includes a first system information area identifier; and the extended sleep cycle configuration information further causes the UE device to, determine whether to store the first system information area identifier in the UE device based on the extended sleep cycle configuration information, determine whether to acquire the second system information from a second cell after entering the active state by determining whether a system information area identifier is stored in the UE device, and acquire the second system information from the second cell in response to the UE device not storing any system information area identifier.

Some example embodiments of the RAN node provide that the first system information includes a first system information area identifier; and the extended sleep cycle configuration information further causes the UE device to, delete the first system information area identifier prior to entering the sleep state.

Some example embodiments of the RAN node provide that the first system information includes a first value tag; and the extended sleep cycle configuration information further causes the UE device to, determine whether to store the first value tag in the UE device based on the extended sleep cycle configuration information, determine whether to acquire the second system information from a second cell after entering the active state by determining whether a value tag is stored in the UE device, and acquire the second system information from the second cell in response to the UE device not storing any value tag.

Some example embodiments of the RAN node provide that the first system information includes a first value tag; and the extended sleep cycle configuration information further causes the UE device to, delete the first value tag prior to entering the sleep state.

Some example embodiments of the RAN node provide that the extended sleep cycle mode is an extended discontinuous reception (eDRX) mode.

BRIEF DESCRIPTION OF THE DRAWINGS

The accompanying drawings, which are incorporated in and constitute a part of the specification, illustrate one or more example embodiments and, together with the description, explain these example embodiments. In the drawings.

DETAILED DESCRIPTION

Figure 1:
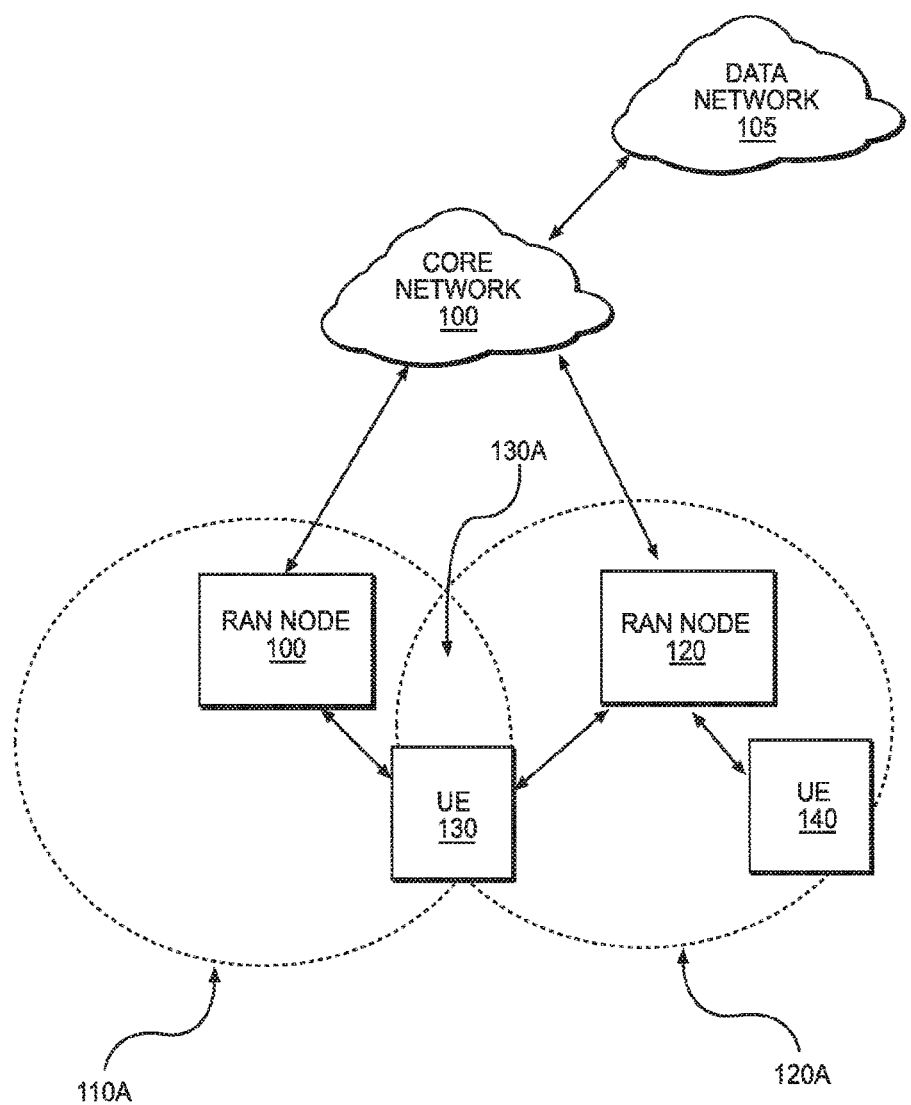
FIG. 1 illustrates a wireless communication system according to at least one example embodiment.

Various example embodiments will now be described more fully with reference to the accompanying drawings in which some example embodiments are shown.

Detailed example embodiments are disclosed herein. However, specific structural and functional details disclosed herein are merely representative for purposes of describing the example embodiments. The example embodiments may, however, may be embodied in many alternate forms and should not be construed as limited to only the example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the example embodiments. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of the example embodiments. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of the example embodiments. However, it will be understood by one of ordinary skill in the art that example embodiments may be practiced without these specific details. For example, systems may be shown in block diagrams in order not to obscure the example embodiments in unnecessary detail. In other instances, well-known processes, structures and techniques may be shown without unnecessary detail in order to avoid obscuring example embodiments.

Also, it is noted that example embodiments may be described as a process depicted as a flowchart, a flow diagram, a data flow diagram, a structure diagram, or a block diagram. Although a flowchart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, a function, a procedure, a subroutine, a subprogram, etc. When a process corresponds to a function, its termination may correspond to a return of the function to the calling function or the main function.

Moreover, as disclosed herein, the term "memory" may represent one or more devices for storing data, including random access memory (RAM), magnetic RAM, core memory, and/or other machine readable mediums for storing information. The term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" may include, but is not limited to, portable or fixed storage devices, optical storage devices, wireless channels, and various other mediums capable of storing, containing or carrying instruction(s) and/or data.

Furthermore, example embodiments may be implemented by hardware circuitry and/or software, firmware, middleware, microcode, hardware description languages, etc., in combination with hardware (e.g., software executed by hardware, etc.). When implemented in software, firmware, middleware or microcode, the program code or code segments to perform the desired tasks may be stored in a machine or computer readable medium such as a non-transitory computer storage medium, and loaded onto one or more processors to perform the desired tasks.

A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

As used in this application, the term "circuitry" and/or "hardware circuitry" may refer to one or more or all of the following: (a) hardware-only circuit implementation (such as implementations in only analog and/or digital circuitry); (b) combinations of hardware circuits and software, such as (as applicable): (i) a combination of analog and/or digital hardware circuit(s) with software/firmware, and (ii) any portions of hardware processor(s) with software (including digital signal processor(s)), software, and memory(ies) that work together to cause an apparatus, such as a mobile phone or server, to perform various functions); and (c) hardware circuit(s) and/or processor(s), such as microprocessor(s) or a portion of a microprocessor(s), that requires software (e.g., firmware) for operation, but the software may not be present when it is not needed for operation. For example, the circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

At least one example embodiment refers to methods for acquiring system information by NR UE devices configured to operate in an extended sleep cycle mode. While the various example embodiments of the present disclosure are discussed in connection with the 5G wireless communication standard for the sake of clarity and convenience, the example embodiments are not limited thereto, and one of ordinary skill in the art would recognize the example embodiments may be applicable to other wireless communication standards, such as the 4G standard, a Wi-Fi standard, a future 6G standard, a future 7G standard, etc.

FIG. 1 illustrates a wireless communication system according to at least one example embodiment. As shown in FIG. 1, a wireless communication system includes a core network 100, and a Data Network 105, a first radio access network (RAN) node 110, and a second RAN node 120, and user equipment (UE) devices (UEs or UE devices) 130 and 140, but the example embodiments are not limited thereto and the example embodiments may include a greater or lesser number of constituent elements. For example, the wireless communication system may include a single UE device, three or more UE devices, a single RAN node, three or more RAN nodes, etc.

The RAN nodes 110 and 120 and/or the UE devices 130 and 140 may be connected over a wireless network, such as a cellular wireless access network (e.g., a 3G wireless access network, a 4G-Long Term Evolution (LTE) network, a 5G-New Radio (e.g., 5G) wireless network, a WiFi network, etc.). The wireless network may include a core network 100 and/or a Data Network 105. The RAN nodes 110 and 120 may connect to each other and/or other RAN nodes (not shown), as well as to the core network 100 and/or the Data Network 105, over a wired and/or wireless network. The core network 100 and the Data Network 105 may connect to each other over a wired and/or wireless network. The Data Network 105 may refer to the Internet, an intranet, a wide area network, etc.

The UE devices 130 and 140 may be any one of, but not limited to, a mobile device, a tablet, a laptop computer, a wearable device, an Internet of Things (IoT) device, a sensor (e.g., thermometers, humidity sensors, pressure sensors, motion sensors, accelerometers, etc.), actuators, robotic devices, robotics, drones, connected medical devices, eHealth devices, smart city related devices, a security camera, autonomous devices (e.g., autonomous cars, etc.), a desktop computer and/or any other type of stationary or portable device capable of operating according to the 5G NR communication standard, and/or other wireless communication standard. The UE devices 130 and 140 may be configurable to operate in an extended sleep cycle mode wherein the UE device is in a "sleep mode" for a desired period of time that may extend beyond one or more defined system information modification periods for the wireless network, extend beyond a desired period of time (e.g., such as one or more hours, days, etc.), such as an extended discontinuous reception (eDRX) mode, but the example embodiments are not limited thereto. For example, the UE devices 130 and/or 140 may be a NR-Light UE device, a REDCAP UE device, etc., but the example embodiments are not limited thereto.

The wireless communication system further includes at least one RAN node (e.g., a base station, a wireless access point, etc.), such as RAN nodes 110 and 120, etc. The RAN nodes 110 and 120 may operate according to an underlying cellular and/or wireless radio access technology (RAT), such as 5G NR, LTE, etc. For example, the RAN nodes 110 and/or 120 may be a 5G gNB node, or a LTE eNB node, or a LTE ng-eNB node, etc., but the example embodiments are not limited thereto. The RAN nodes 110 and 120 may each provide wireless network services to one or more UE devices within a cell service area (e.g., a broadcast area, a serving area, a coverage area, etc.) surrounding the respective physical location of the RAN node, such as a cell service area 110A surrounding the RAN node 110, and a cell service area 120A surrounding the RAN node 120, etc. For example, UE device 140 is located within the cell service area 120A, and may connect to, receive broadcast messages from, receive paging messages from, receive/transmit signaling messages from/to, and/or access the wireless network through, etc., RAN node 120, but the example embodiments are not limited thereto. Additionally, there may be overlap between two or more cell service areas, such as the overlap region 130A of FIG. 1, and UE devices located within the overlap region, such as UE device 130 located within overlap region 130A, may connect to either RAN node 110 and RAN node 120, may access RAN node 110 and RAN node 120 simultaneously, etc. Moreover, one or more UE devices may travel from one cell servicing area to another cell servicing area as well.

Additionally, the RAN node and/or the corresponding cell servicing area may be referred to as a cell of the wireless network, and the wireless network may be segmented and/or defined as comprising one or more system areas including one or more cells. For example, the cells corresponding to RAN node 110 and the RAN node 120 of FIG. 1, may be included in a first system area, but are not limited thereto. The system area may be an administrative, logical, and/or geographical component of the wireless network, and, for example, wireless network resources, administrative messages, network functions, etc., may be communicated to/from UE devices serviced by the wireless network on a system area basis, and/or cell-specific basis, etc.

The RAN nodes 110 and/or 120 may be connected to at least one core network element (not shown) residing on the core network 100, such as a core network device, a core network server, access points, switches, routers, nodes, etc., but the example embodiments are not limited thereto. The core network 100 may provide network functions, such as an access and mobility management function (AMF), a session management function (SMF), a policy control function (PCF), a unified data management (UDM), a user plane function (UPF), an authentication server function (AUSF), an application function (AF), and/or a network slice selection function (NSSF), etc., but the example embodiments are not limited thereto.

While certain components of a wireless communication network are shown as part of the wireless communication system of FIG. 1, the example embodiments are not limited thereto, and the wireless communication network may include components other than that shown in FIG. 1, which are desired, necessary, and/or beneficial for operation of the underlying networks within the wireless communication system 100, such as access points, switches, routers, nodes, servers, gateways, etc.

Figure 2:
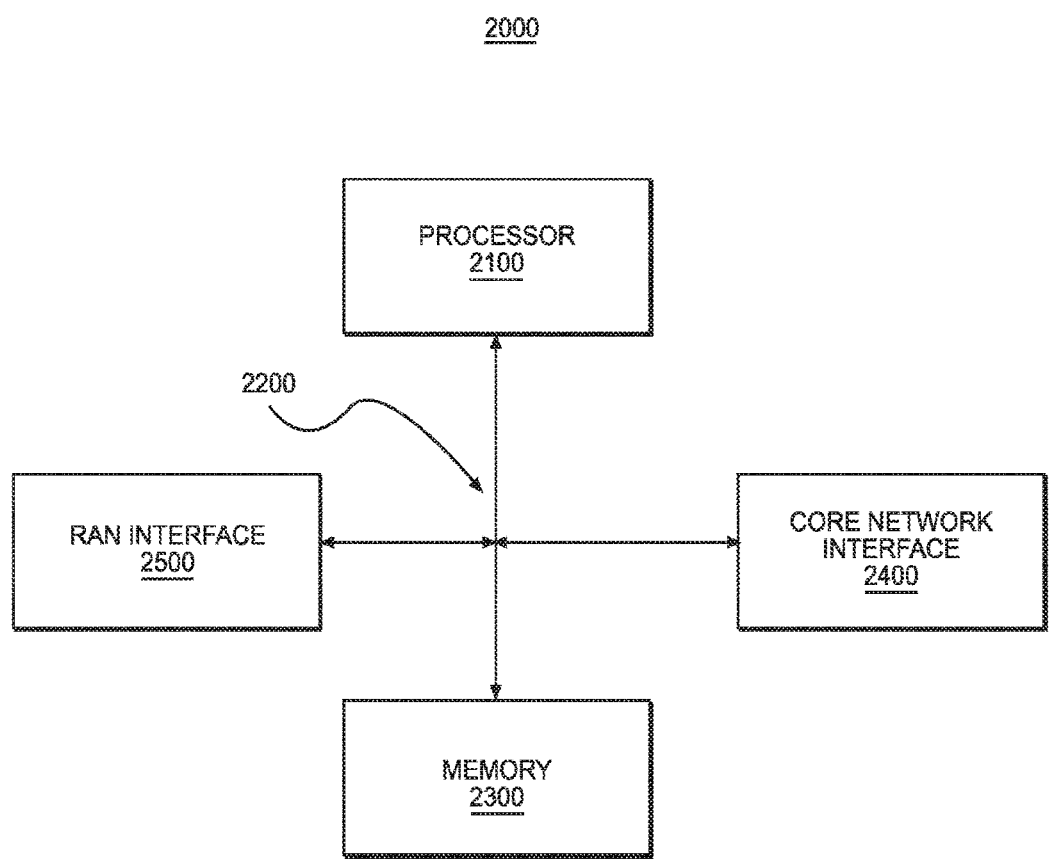
FIG. 2 illustrates a block diagram of an example RAN node according to at least one example embodiment.

FIG. 2 illustrates a block diagram of an example RAN node according to at least one example embodiment. The RAN node may be the first RAN node 110 and/or the second RAN node 120 of FIG. 1, but is not limited thereto.

Referring to FIG. 2, a RAN node 2000 may include processing circuitry, such as the at least one processor 2100, a communication bus 2200, a memory 2300, at least one core network interface 2400, and/or at least one radio access network (RAN) network interface 2500, but the example embodiments are not limited thereto. For example, the core network interface 2400 and the RAN network interface 2500 may be combined into a single network interface, etc., or the RAN node 2000 may include a plurality of RAN interfaces, a plurality of core network interfaces, etc., and/or combinations thereof. The memory 2300 may include various special purpose program code including computer executable instructions which may cause the RAN node 2000 to perform the one or more of the methods of the example embodiments.

In at least one example embodiment, the processing circuitry may include at least one processor (and/or processor cores, distributed processors, networked processors, etc.), such as the at least one processor 2100, which may be configured to control one or more elements of the RAN node 2000, and thereby cause the RAN node 2000 to perform various operations. The processing circuitry (e.g., the at least one processor 2100, etc.) is configured to execute processes by retrieving program code (e.g., computer readable instructions) and data from the memory 2300 to process them, thereby executing special purpose control and functions of the entire RAN node 2000. Once the special purpose program instructions are loaded into, (e.g., the at least one processor 2100, etc.), the at least one processor 2100 executes the special purpose program instructions, thereby transforming the at least one processor 2100 into a special purpose processor.

In at least one example embodiment, the memory 2300 may be a non-transitory computer-readable storage medium and may include a random access memory (RAM), a read only memory (ROM), and/or a permanent mass storage device such as a disk drive, or a solid state drive. Stored in the memory 2300 is program code (i.e., computer readable instructions) related to operating the RAN node 2000, such as the methods discussed in connection with FIGS. 4 to 6, the at least one core network interface 2400, and/or at least one RAN network interface 2500, etc. Such software elements may be loaded from a non-transitory computer-readable storage medium independent of the memory 2300, using a drive mechanism (not shown) connected to the RAN node 2000, or via the at least one core network interface 2400, and/or at least one RAN network interface 2500, etc.

In at least one example embodiment, the communication bus 2200 may enable communication and data transmission to be performed between elements of the RAN node 2000. The bus 2200 may be implemented using a high-speed serial bus, a parallel bus, and/or any other appropriate communication technology. According to at least one example embodiment, the RAN node 2000 may include a plurality of communication buses (not shown), such as an address bus, a data bus, etc.

The RAN node 2000 may operate as, for example, a 4G RAN node, a 5G RAN node, etc., and may be configured to schedule resource blocks for UE devices connected to the RAN node 2000.

For example, the RAN node 2000 may allocate time-frequency resources of a carrier (e.g., resource blocks with time and frequency dimensions) based on operation on the time domain (e.g., time division duplexing) and the frequency domain (e.g., frequency division duplexing). In the time domain context, the RAN node 2000 will allocate a carrier (or subbands of the carrier) to one or more UEs (e.g., UEs 130, 140, etc.) connected to the RAN node 2000 during designated upload (e.g., uplink) time periods and designated download (e.g., downlink) time periods. When there are multiple UEs connected to the RAN node 2000, the carrier is shared in time such that each UE is scheduled by the RAN node 2000, and the RAN node 2000 allocates each UE with their own uplink time and/or downlink time. In the frequency domain context, the RAN node 2000 will allocate separate frequency subbands of the carrier to UEs simultaneously served by the RAN node 2000, for uplink and/or downlink transmissions. Data transmission between the UE and the RAN node 2000 may occur on a radio frame basis in both the time domain and frequency domain contexts. The minimum resource unit for allocation and/or assignment by the RAN node 2000 to a particular UE device, i.e. a resource block, corresponds to a specific downlink/uplink time slot (e.g., one OFDM symbol, one slot, one subframe, etc.) and/or a specific downlink/uplink frequency subband (e.g., twelve adjacent subcarriers, etc.).

For the sake of clarity and consistency, the example embodiments will be described as using the time domain, but the example embodiments are not limited thereto and the example embodiments may operate in the frequency domain Additionally, the RAN node 2000 may transmit extended sleep cycle configuration information (e.g., eDRX configuration information, etc.) to the one or more UE devices located within the cell servicing area of the RAN node 2000, which may configure the one or more UE devices to operate in extended sleep cycle mode in accordance with the extended sleep cycle configuration information. Additionally, according to some example embodiments, the UE device may be pre-configured and/or self-configured to operate in the extended sleep cycle mode, and the RAN node 2000 may transmit update messages to update, modify, and/or delete existing extended sleep cycle configuration information stored on the one or more UE devices. For example, the extended sleep cycle configuration information may include information related to the duration for each of a plurality of sleep cycle modes, (e.g., an active state (e.g., a full power usage state, an awake state, etc.), an intermediate state (e.g., an intermediate power usage state), a sleep state (e.g., a reduced and/or low power usage state, etc.), etc.), and protocols for accessing a wireless network upon entering the active state, such as acquiring system information from RAN nodes of the wireless network, etc. Furthermore, the RAN node 2000 may also receive extended sleep cycle messages indicating that a UE device will enter into a sleep mode, or has entered an active mode, etc., from the at least one UE device. The extended sleep cycle mode and the extended sleep cycle configuration information will be discussed in further detail in connection with FIGS. 4 to 6.

The RAN node 2000 may also include at least one core network interface 2400, and/or at least one RAN network interface 2500, etc. The at least one RAN network interface 2500 may include an associated radio unit (not shown) and may be used to transmit the wireless signals in accordance with a radio access technology, such as 4G LTE wireless signals, 5G NR wireless signals, etc., to at least one RAN node, such as RAN node 120, and/or to at least one UE device, such as UE 130, UE 140, etc. According to some example embodiments, the RAN network interface 2500 may be a single antenna, or may be a plurality of antennas, etc.

The RAN node 2000 may communicate with a core network (e.g., backend network, backhaul network, backbone network, Data Network, etc.) of the wireless communication network via a core network interface 2400. The core network interface 2400 may be a wired and/or wireless network interface and may enable the RAN node 2000 to communicate and/or transmit data to and from to network devices on the backend network, such as a core network gateway (not shown), a Data Network (not shown), such as the Internet, intranets, wide area networks, telephone networks, VoIP networks, etc.

Figure 3:
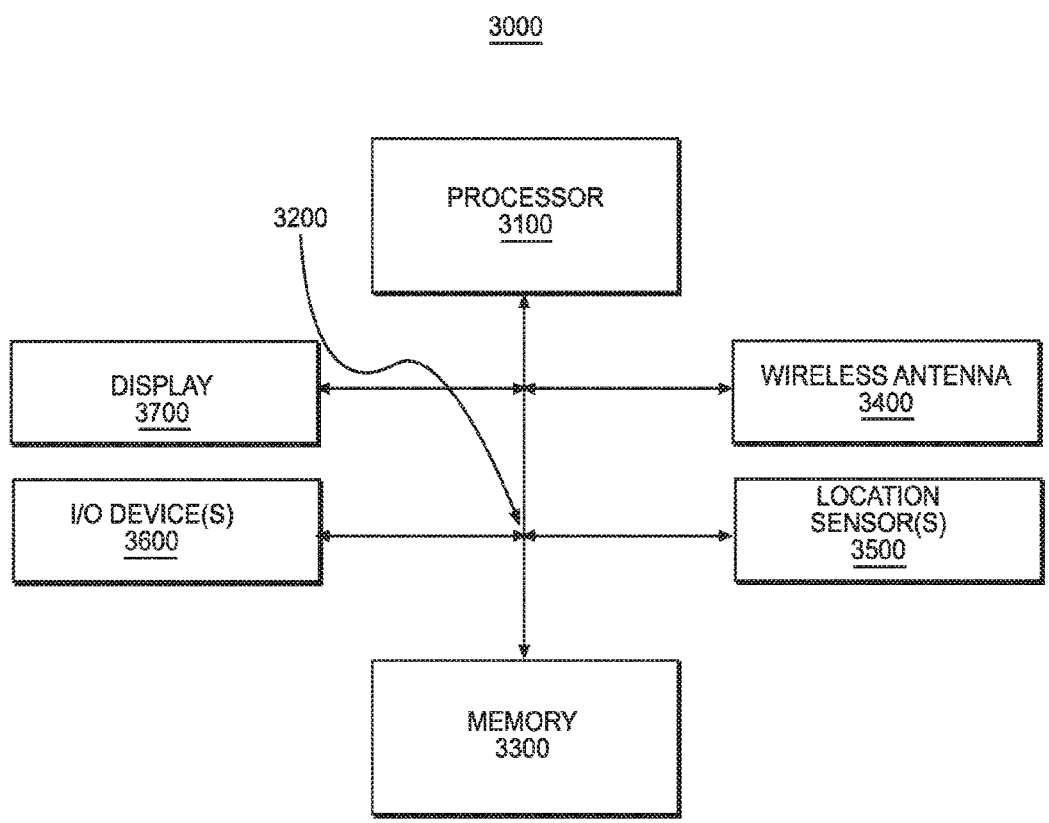
FIG. 3 illustrates a block diagram of a UE device according to at least one example embodiment.

While FIG. 2 depicts an example embodiment of a RAN node 2000, the RAN node is not limited thereto, and may include additional and/or alternative architectures that may be suitable for the purposes demonstrated. For example, the functionality of the RAN node 2000 may be divided among a plurality of physical, logical, and/or virtual network elements, such as a centralized unit (CU), a distributed unit (DU), a remote radio head (RRH), and/or a remote radio unit (RRU), etc., but the example embodiments are not limited thereto. Additionally, the RAN node 2000 may operate in standalone (SA) mode and/or non-standalone (NSA) mode using interfaces (not shown) such as X2, Xn, etc., between the RAN node 2000 and other RAN nodes of the wireless network, interfaces, such as S1, NG, etc., between the RAN node 2000 and the core network (e.g., core network 100), interfaces between network functions of the RAN node 2000 operating in a distributed and/or virtual RAN mode (not shown), such as F1, E1, etc., and/or interfaces between the physical layer (e.g., a baseband unit, etc.) and the radio layer (e.g., a RRH, RAN interface 2500, etc.) (not shown), such as CPRI, eCPRI, etc., but the example embodiments are not limited thereto FIG. 3 illustrates a block diagram of an example UE device according to at least one example embodiment. The example UE device of FIG. 3 may correspond to the first UE device 130 and/or the second UE device 140 of FIG. 1, but the example embodiments are not limited thereto. According to at least one example embodiment, the UE device of FIG. 3 may be a NR-Light and/or REDCAP UE device, but the example embodiments are not limited thereto.

Referring to FIG. 3, a UE 3000 may include processing circuitry, such as the at least one processor 3100, a communication bus 3200, a memory 3200, at least one wireless antenna 3400, at least one location sensor 3500, at least one input/output (I/O) device 3600 (e.g., a keyboard, a touchscreen, a mouse, a microphone, a camera, a speaker, etc.), and/or a display panel 3700 (e.g., a monitor, a touchscreen, etc.), but the example embodiments are not limited thereto. However, the example embodiments are not limited thereto, and the UE 3000 may include a greater or lesser number of constituent components. For example, the UE 3000 may also include a battery, one or more additional sensors (e.g., thermometers, humidity sensors, pressure sensors, motion sensors, accelerometers, etc.), actuators, etc. Additionally, the location sensor 3500, the display panel 3700, and/or I/O device 3600, etc., of UE 3000 may be optional.

In at least one example embodiment, the processing circuitry may include at least one processor (and/or processor cores, distributed processors, networked processors, etc.), such as the at least one processor 3100, which may be configured to control one or more elements of the UE 3000, and thereby cause the UE 3000 to perform various operations. The processing circuitry (e.g., the at least one processor 3100, etc.) is configured to execute processes by retrieving program code (e.g., computer readable instructions) and data from the memory 3200 to process them, thereby executing special purpose control and functions of the entire UE 3000. Once the special purpose program instructions are loaded into the processing circuitry (e.g., the at least one processor 3100, etc.), the at least one processor 3100 executes the special purpose program instructions, thereby transforming the at least one processor 3100 into a special purpose processor.

In at least one example embodiment, the memory 3200 may be a non-transitory computer-readable storage medium and may include a random access memory (RAM), a read only memory (ROM), and/or a permanent mass storage device such as a disk drive, or a solid state drive. Stored in the memory 3200 is program code (i.e., computer readable instructions) related to operating the UE 3000, such as the methods discussed in connection with FIGS. 4 to 6, the wireless antenna 3400, and/or the location sensor 3500, etc. Such software elements may be loaded from a non-transitory computer-readable storage medium independent of the memory 3200, using a drive mechanism (not shown) connected to the UE 3000, or via the wireless antenna 3400, etc. Additionally, the memory 3200 may store network configuration information, such as system information, etc., for communicating with at least on RAN node, e.g., RAN nodes 120 and/or 130, etc., accessing a wireless network, and/or extended sleep cycle configuration information (e.g., eDRX configuration information, etc.), but the example embodiments are not limited thereto.

For example, according to at least one example embodiment, the UE 3000 may be pre-configured and/or configured by an operator of the UE 3000 to operate in an extended sleep cycle mode, and the UE 3000 may generate and store the extended sleep cycle configuration information corresponding to the settings of the extended sleep cycle mode in the memory 3200. In other example embodiments, the UE 3000 may receive the extended sleep cycle configuration information, using at least one wireless antenna 3400, from at least one RAN node, such as RAN nodes 110 and/or 120, via a paging message (e.g., a signaling message, etc.), a cell-specific message, a system area-specific message, and/or a network-wide message, which may cause the UE 3000 to configure itself to operate in extended sleep cycle mode (e.g., eDRX mode, etc.) in accordance with and/or based on the extended sleep cycle configuration (e.g., eDRX configuration information, eDRX parameters, etc.), or in other words, the core network 100 may configure and/or cause the UE 3000 to operate in extended sleep cycle mode based on the transmitted extended sleep cycle configuration information.

According to at least one example embodiment, the extended sleep cycle configuration information may cause the UE 3000 to operate in one or more sleep cycle states, e.g., an active state (e.g., a state where the UE 3000 may be awake and actively receiving and/or transmitting information to/from a RAN node), an intermediate state (e.g., an intermediate power usage state), an idle state and/or paging state (e.g., the UE 3000 is not actively transmitting, but may receive paging messages from the wireless network, etc.), a sleep state (e.g., a reduced and/or low power usage state with reduced or no communication capabilities wherein the wireless antenna 3400 and/or other components of the UE 3000 are powered off to reduce power usage and/or conserve battery life), etc., in accordance with extended sleep cycle schedule information included in the extended sleep cycle configuration information, inputs received from sensors and/or input devices included in the UE 3000, a battery charge level (e.g., remaining battery life) of the UE 3000, etc. As an example, the extended sleep cycle configuration information may schedule the UE 3000 to stay in a sleep mode for a desired period, e.g., for several hours, etc., before entering an active mode (e.g., an active state, etc.). Additionally, the UE 3000 may also receive extended sleep cycle configuration messages from the at least one RAN node 110 and/or 120, which may update, modify, replace, and/or delete extended sleep cycle configuration information previously stored in the memory 3200. Furthermore, the UE 3000 may also transmit extended sleep cycle message indicating that the UE 3000 will enter into a sleep mode (e.g., a sleep state, etc.), or has entered an active mode, etc., to the at least one RAN node 110 and/or 120.

In at least one example embodiment, the communication bus 3200 may enable communication and data transmission to be performed between elements of the UE 3000. The bus 3200 may be implemented using a high-speed serial bus, a parallel bus, and/or any other appropriate communication technology. According to at least one example embodiment, the UE 3000 may include a plurality of communication buses (not shown), such as an address bus, a data bus, etc.

The UE 3000 may also include at least one wireless antenna 3400. The wireless antenna 3400 may include an associated radio unit (not shown) and may be used to transmit wireless signals in accordance with at least one desired radio access technology, such as 4G LTE, 5G NR, Wi-Fi, etc. According to some example embodiments, the wireless antenna 3400 may be a single antenna, or may be a plurality of antennas, etc.

The UE 3000 may also include at least one location sensor 3500 to calculate the absolute and/or relative location of the UE 3000. The at least one location sensor 3500 may be a GNSS sensor, such as a GPS sensor, a GLONASS sensor, a Galileo sensor, a Beidou sensor, etc., an inertial movement sensors, such as a gyroscope, an accelerometer, an altimeter, etc. Additionally, the location sensor 3500 and/or the processor 3100 may also use cellular network based positioning services, such as a cellular network location service (e.g., a location management function (LMF) service of the core network), an Assisted-GPS (A-GPS) function, etc., to determine the current location of the UE 3000.

While FIG. 3 depicts an example embodiment of a UE 3000, the UE device is not limited thereto, and may include additional and/or alternative architectures that may be suitable for the purposes demonstrated.

Figure 4:
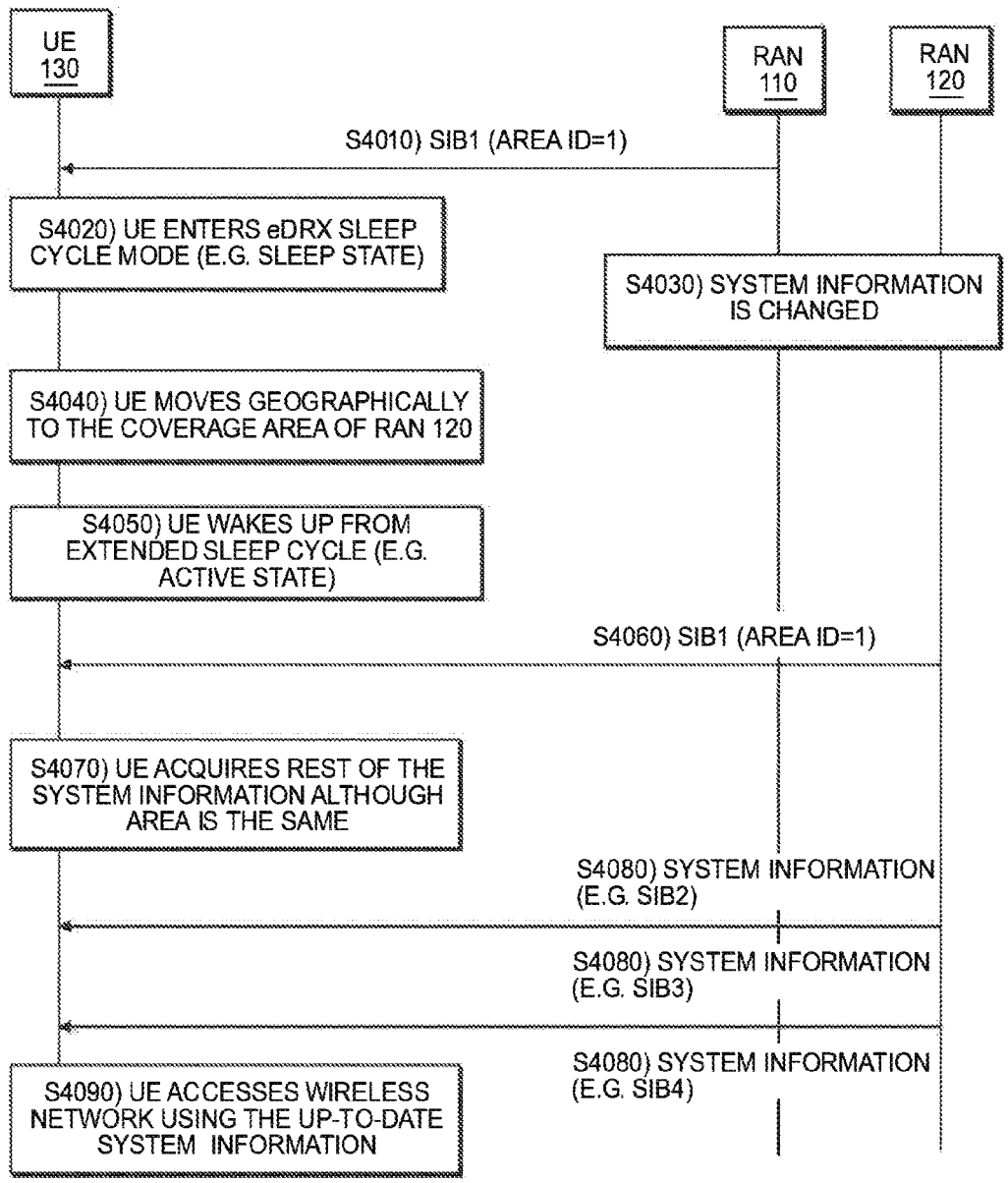
FIGS. 4 to 6 illustrate example transmission flow diagrams between a UE device and one or more RAN nodes according to some example embodiments.
Figure 5:
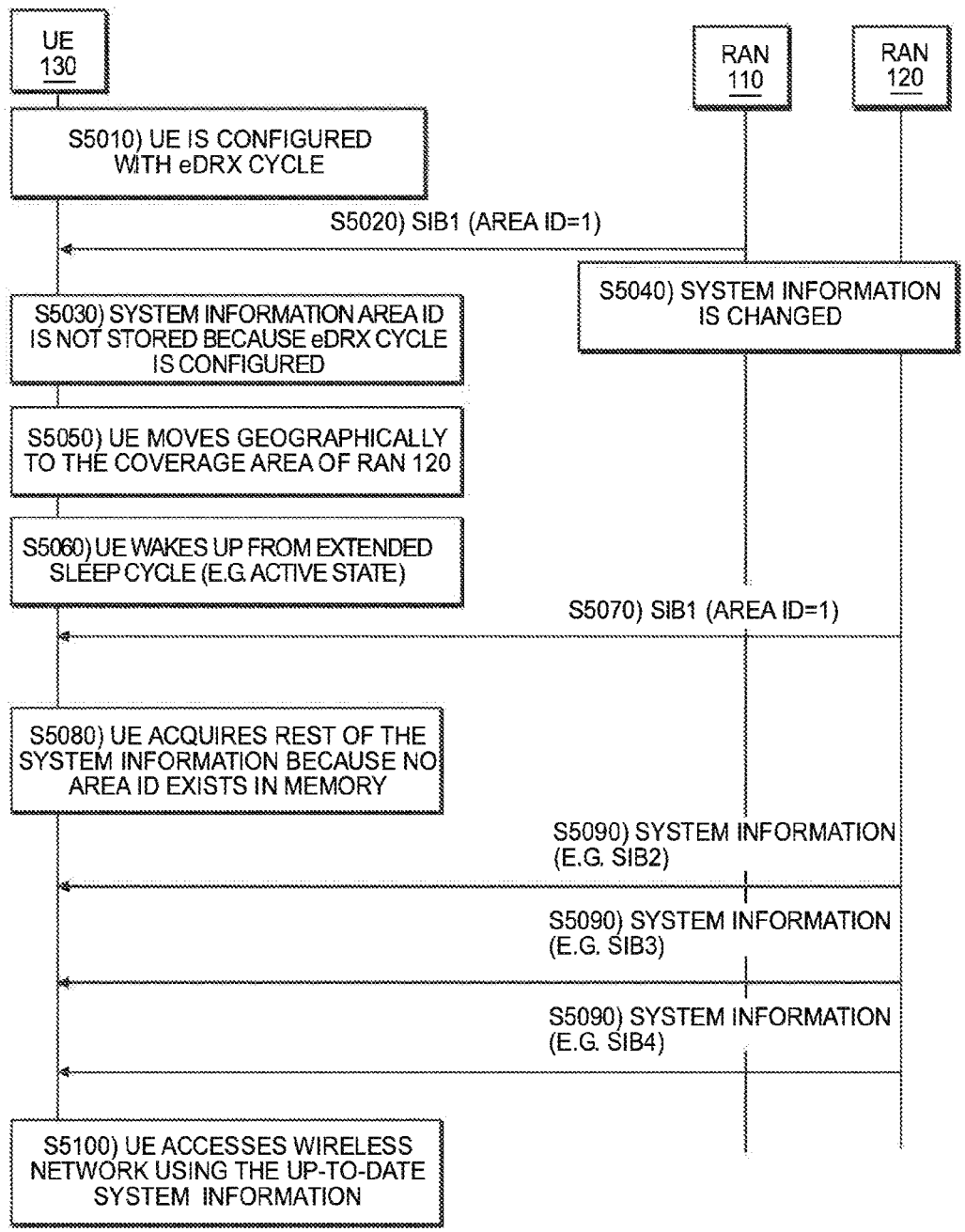
Figure 6:
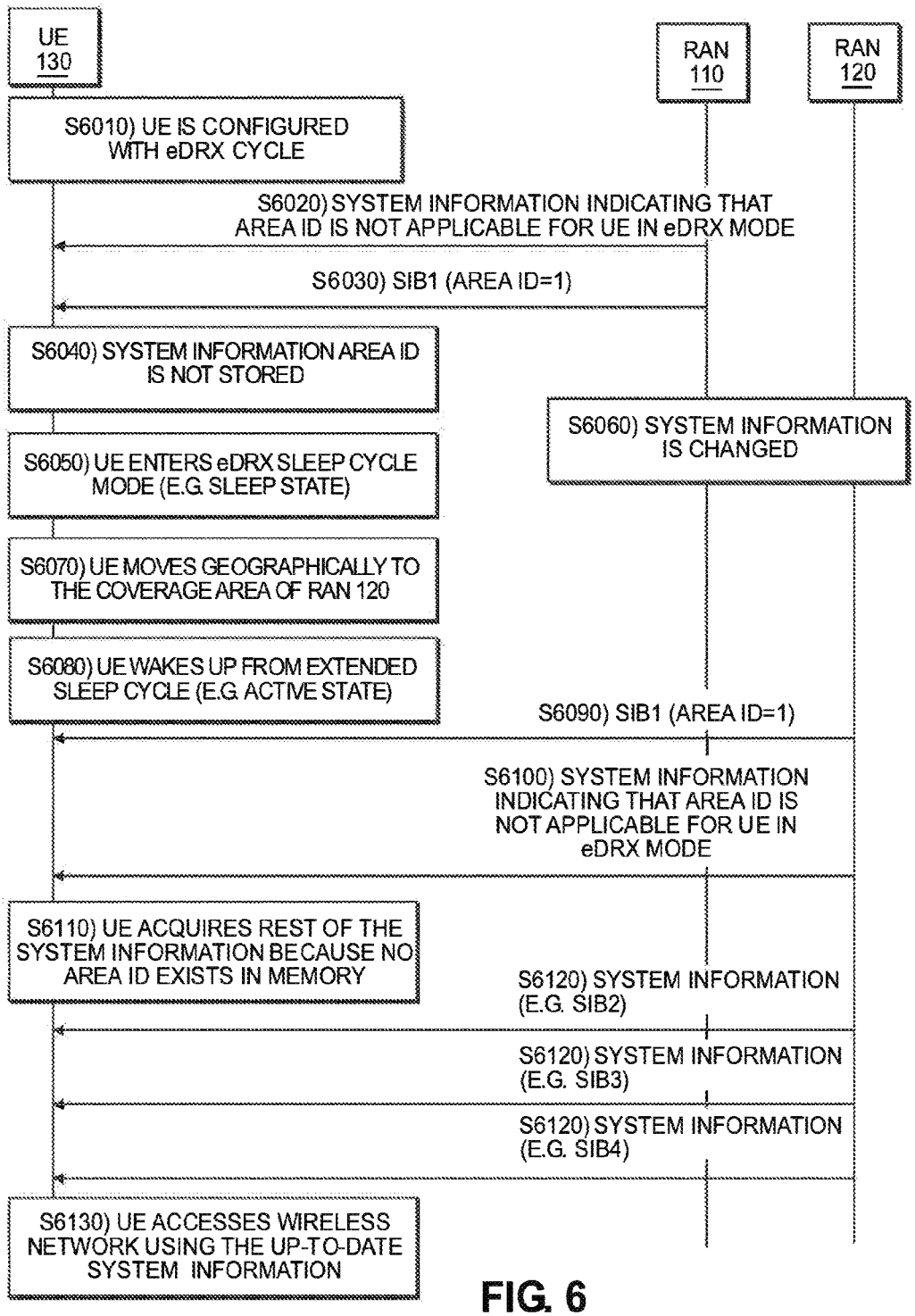

FIGS. 4 to 6 illustrate transmission flow diagrams between at least one UE device and at least one RAN node according to some example embodiments. In the example embodiments of FIGS. 4 to 6, it is assumed that RAN node 110 and RAN node 120 are both located in the same system area 1, and therefore have a system area ID of "1", but the example embodiments are not limited thereto.

Referring now to FIG. 4, in at least one example embodiment, a UE device, such as UE device 130, may be a UE device which has been pre-configured to operate in an extended sleep cycle mode, or in other words, the extended sleep cycle configuration information and/or settings have been stored in the memory of the UE device 130 prior to the illustrated operations of FIG. 4, but the example embodiments are not limited thereto.

In operation S4010, the UE device 130 may search for and select a cell (e.g., an initial cell, a first cell, etc.) of the wireless network that the UE device 130 is located within, e.g., cell 110A of RAN node 110. Additionally, the UE device 130 may receive a primary synchronization signal (PSS) and/or secondary synchronization signal (SS) via a synchronization signal block (SSB) and/or physical broadcast channel (PBCH) from the RAN node of the cell (e.g., RAN node 110), which may include a cell identifier (e.g., a physical cell identifier, a cell identifier, etc.) which uniquely identifies a cell servicing area within the wireless network corresponding to the cell. Further, the UE device 130 may receive and decode/read system information block SIB1 message from the selected RAN node, but the example embodiments are not limited thereto. The SIB1 may include cell-specific information (e.g., information which is valid for a specific cell only), or system area-specific information (e.g., information which is valid across a plurality of cells of the same system area). The SIB1 message may be periodically broadcast to the entire cell servicing area, e.g., cell servicing area 110A, of RAN node 110, or may be dedicatedly transmitted to one or more UEs. The SIB1 message may include system information which allows the UE device 130 to access the wireless network (e.g., transmit/receive) through the RAN node 110 (e.g., network configuration information, etc.), a system area identifier (e.g., an area identifier, a system identifier, a system area information identifier, etc.) which uniquely identifies the system area that the RAN node, e.g., RAN node 110 and RAN node 120, is located within, etc. Optionally, the SIB1 message may also include a value tag which identifies the version number of the system information being transmitted within the SIB1 message. For example, in the 5G NR standard, the value tag is a 5-bit value that is incremented (modulo 32) whenever a change is made to the system information, however the example embodiments are not limited thereto.

According to some example embodiment, the UE device 130 may determine whether to store the received system information, including the system area identifier and/or the value tag, etc., in memory based on the extended sleep cycle configuration information. As a first example, the extended sleep cycle configuration information may indicate that the received system information is to be stored in the memory of the UE device 130. In a second example, the extended sleep cycle configuration information may indicate that the UE device 130 does not store a portion of the received system information in memory, such as the system area identifier and/or the value tag, etc. However, the example embodiments are not limited thereto.

In operation S4020, the UE device 130 may enter the extended sleep cycle (e.g., eDRX mode, etc.), such as entering into a sleep mode for a desired period of time, in accordance with the extended sleep cycle configuration information, which causes the UE device 130 to not receive and/or transmit messages with the RAN node 110 (e.g., power off the wireless antenna 3400, etc.). The desired period of time may be for example, minutes, hours, days, etc., but the example embodiments are not limited thereto, and may exceed a synchronization period (e.g., system frame number (SFN) cycle), a broadcast control channel (BCCH) modification period, etc., of the wireless network. For example, according to the current 5G standard, the SFN cycle may last for up to 3 hours. Consequently, if the UE device 130 is in sleep mode for longer than 3 hours, the UE device 130 will be out of synchronization with the wireless network and/or RAN node 110, and therefore may not be able to reconnect to the RAN node 110 upon waking up (e.g., entering the active state) using the received system information (and/or network configuration information) from the SIB1 message in operation S4010 because the system information (and/or network configuration information) is out of sync (e.g., out of date, invalid, etc.). Moreover, in other situations, the received system information (and/or network configuration information) may be invalid and/or inapplicable due to the UE device 130 changing geographical locations and/or cell servicing areas while in the sleep state, or from the system information being modified by a multiple of 32 (e.g., 5 bits), so that the UE device 130 incorrectly determines that the system information received in operation S4010 is still valid based on the value tag being the same.

Additionally, in optional operation S4030, the system information of the corresponding system area may change while the UE device 130 is in the sleep state. For example, one or more of the RAN nodes associated with system area 1 may have gone offline, rebooted, changed cell identifiers, etc., and/or the system information for accessing the wireless network may have been modified, etc. In operation S4040, the UE device 130 may also change geographic locations while the UE device 130 is in the sleep state, and for example, the UE device 130 may change from the cell servicing area of RAN node 110 to the cell servicing area of RAN node 120, but is not limited thereto, and therefore the previously received system information may be incorrect, invalid, out of sync, out of date, inapplicable, etc.

In operation S4050, the UE device 130 wakes up from the sleep state and enters an active state (e.g., full power mode, active transmit/receive state, etc.) upon the expiration of the desired sleep mode time period, in accordance with and/or based on the extended sleep cycle configuration information. The UE device 130 may additionally select a new cell (e.g., a current cell, a second cell, etc.) based on the current location of the UE device 130, e.g., select a cell based on which cell service area the UE device 130 is currently located within and/or based on the strongest signal strength received from a plurality of servicing cells, etc., but the example embodiments are not limited thereto. Further, according to some example embodiments, the cell selection operation may also include a cell reselection operation, a reconfiguration with sync operation, and/or a handover operation performed by the UE device 130, the RAN node 110 and/or RAN node 120, etc., but the example embodiments are not limited thereto.

The UE device 130 may then determine whether to acquire (and/or force acquisition) of the system information from the new/current cell (e.g., a second cell, etc.). The UE device 130 may determine to acquire and/or force acquisition of the system information from the new/current cell based on whether the previously received, e.g., initial, system information is valid. In at least one example embodiment, the UE device 130 may determine whether the previously received system information is valid by determining whether the UE device 130 has moved into a new cell servicing area based on a cell identifier received from the new cell via, for example, a periodic SSB/PBCH message received from the new cell, but the example embodiments are not limited thereto.

Additionally, according to some example embodiments, the UE device 130 may determine that the initial system information is invalid based on the information stored in the memory of the UE device and rules contained in the extended sleep cycle configuration information. For example, if there is no system information stored in memory (e.g., the system information was previously deleted, etc.), or the stored system information is missing the system area identifier and/or the value tag, the UE device 130 may then determine the initial system information is invalid. As another example, the extended sleep cycle configuration information rules may indicate that the UE device 130 automatically determines that the system information is invalid based on a length of time that the UE device 130 has been in the sleep state, such as when the UE device 130 has been in the sleep state for longer than a desired threshold period of time corresponding to a length of the synchronization period for the wireless network, the length of a BCCH modification period, etc., but the example embodiments are not limited thereto.

Based on the results of the initial system information validity determination, the UE device 130 may then acquire and/or force acquisition of the system information in the current cell (e.g., a new cell, a second cell, etc.) after selecting the current cell that the UE device 130 is located within (e.g., perform a cell reselection operation) when the previously received system information is invalid. In operation S4060, the UE device 130 may then acquire and/or receive a new SIB1 message from the current cell corresponding to RAN node 120. The new SIB1 message received in step S4060 may include current system information from RAN node 120, a system area identifier corresponding to the system area of the current cell (e.g., RAN node 120), and/or a value tag indicating the version number of the current system information, etc., but the example embodiments are not limited thereto.

According to some example embodiments, in operation S4070, the UE device 130 may determine whether additional system information (e.g., network configuration information, etc.) is desired and/or required before the UE device 130 may access the cell of RAN node 120 and/or the wireless network. If the UE device 130 determines that additional system information is desired and/or required, the UE device 130 may wait for the periodic broadcast by the RAN node 120 of additional system information messages, such as SIB2, SIB3, SIB4, etc., messages (e.g., operation S4080), which may include the additional system information and/or network configuration information. Additionally, in at least one other example embodiment, the UE device 130 may transmit a request to the RAN node 120 for the additional system information and/or network configuration information. The RAN node 120 may then transmit the additional system information and/or network configuration information to the UE device 130 via a signaling message. In operation S4090, once the UE device 130 receives the valid system information and/or network configuration information, the UE device 130 accesses the wireless network via the RAN node 120.

Referring now to FIG. 5, a second transmission flow diagram is depicted according to at least one example embodiment. In FIG. 5, in contrast to the at least one example embodiment of FIG. 4, the UE device 130 has not been pre-configured to operate in an extended sleep cycle mode. According to at least one example embodiment, in operation S5010, the RAN node 110, or an initial RAN node, may configure the UE device 130 to operate in an extended sleep cycle mode (e.g., eDRX mode, etc.) by transmitting extended sleep cycle information (e.g., eDRX configuration information, eDRX parameters, etc.) to the UE device 130. The extended sleep cycle information may be transmitted to the UE device 130 via a signaling message, such as a radio resource control (RRC) message, non-access stratum (NAS) message, etc.

For example, the UE device 130 may register for an extended sleep cycle mode (e.g., eDRX mode, etc.) with the wireless network during an attach and/or tracking area update operation. The UE may request the use of the extended sleep cycle mode (e.g., eDRX mode) during an attach or tracking area updating procedure by including the extended sleep cycle mode parameters, e.g., eDRX parameters, etc. The UE device 130 and the wireless network (e.g., core network 100, etc.) may negotiate the extended sleep cycle mode parameters (e.g., eDRX parameters, etc.) during a tracking area updating procedure when the UE has a data network (e.g., PDN, etc.) connection for emergency bearer services. The wireless network may accept the request from the UE device 130 to use the extended sleep cycle mode (e.g., eDRX mode, etc.) by providing the extended sleep cycle mode parameters (e.g., eDRX parameters, etc.) when accepting the attach or the tracking area updating procedure, however the example embodiments are not limited thereto. Additionally, according to some example embodiments, in the event that the UE device 130 was previously configured to operate in extended sleep cycle mode, the RAN node 110 may transmit modified, updated, and/or additional extended sleep cycle configuration information to modify and/or update the extended sleep cycle configuration of the UE device 130, etc.

In operation S5020, the UE device 130 may select the initial RAN node 110, and may receive a SIB1 broadcast message from the RAN node 110, and the SIB1 message may include system information and/or network configuration information associated with RAN node 110, a system area identifier associated with RAN node 110, and/or a value tag associated with the version number of the system information, etc., similar to operation S4010 of FIG. 4.

According to at least one example embodiment, in operation S5030, the extended sleep cycle configuration information received by the UE device 130 may cause the UE device 130 to not store the system area identifier and/or value tag of the received system information. In other example embodiments, the UE device 130 may delete the entire received system information and/or delete the system area identifier and/or the value tag, based on the extended sleep cycle configuration information. Additionally, the UE device 130 may enter a sleep state based on the extended sleep cycle configuration information. While the UE device 130 is in the sleep state, in operation S5040, the system information (and/or network configuration information) for system area 1, RAN node 110, and/or RAN node 120 may be changed.

Optionally, in operation S5050, the UE device 130 may change locations from the initial cell of RAN node 110 to the current cell of RAN node 120, similar to operation S4040 of FIG. 4. However, the example embodiments are not limited thereto, and for example, the UE device 130 may be located in a geographic location that is served by both RAN node 110 and RAN node 120 (e.g., the overlap region 130A of FIG. 1), such that the geographic location of the UE device 130 has not changed but the UE device 130 may be served by a different cell (e.g., RAN node 120) upon wake up (e.g., exiting the sleep state and/or entering the active state, etc.), and/or the cell identifier for RAN node 110 may have changed (due to reboot of the RAN node 110, a handover operation between RAN node 110 and RAN node 120, a change made by a network administer, etc.) while the UE device 130 was asleep, etc.

In operation S5060, similar to operation S4050 of FIG. 4, the UE device 130 may wake up from the sleep state after the expiration of the duration of the sleep mode, and may enter an active state in accordance with the extended sleep cycle configuration information. The UE device 130 then determines whether to acquire (and/or force acquisition) of the system information from a new/current cell based on the extended sleep cycle configuration information. For example, the UE device 130 determine to acquire (and/or force acquisition) of the system information from the new/current cell based on whether the previously received system information is valid.

Additionally, according to some example embodiments, the UE device 130 may determine that the initial system information is invalid based on the information stored in the memory of the UE device and rules contained in the extended sleep cycle configuration information. Because the extended sleep cycle configuration information caused the UE device 130 to not store the initial system information, initial system area identifier, and/or initial value tag in operation S5030, the UE device 130 automatically determines the initial system information is invalid.

Based on the results of the initial system information validity determination, the UE device 130 then acquire (and/or force acquisition) of a current cell (e.g., a new cell, a second cell, etc.) by selecting the current cell that the UE device 130 is located within (e.g., cell 120A of RAN node 120). According to some example embodiments, the cell selection operation may instead be a cell reselection operation, a reconfiguration with sync operation, and/or may occur due to a handover operation performed by a RAN node, etc. The selection of the current cell may further include the receiving of a cell identifier of the current cell from a PSS and/or SSS signal received from the current cell. In operation S4060, the UE device 130 may then acquire and/or receive a new SIB1 message from the current cell corresponding to RAN node 120. The new SIB1 message may include current system information from RAN node 120, a system area identifier corresponding to the system area of the current cell (e.g., cell 120A of RAN node 120), and/or a value tag indicating the version number of the current system information, etc., but the example embodiments are not limited thereto.

Similar to operation S4070 of FIG. 4, in operation S5080, the UE device 130 may determine whether additional system information (e.g., network configuration information, etc.) is desired and/or required before the UE device 130 may access the cell 120A of RAN node 120 and/or the wireless network. If the UE device 130 determines that additional system information is desired and/or required, the UE device 130 may wait for the periodic broadcast by the RAN node 120 of additional system information messages, such as SIB2, SIB3, SIB4, etc., messages (e.g., operation S5090), which may include the additional system information and/or network configuration information. Additionally, in at least one other example embodiment, the UE device 130 may transmit a request to the RAN node 120 for the additional system information and/or network configuration information, and the RAN node 120 may then transmit the additional system information and/or network configuration information to the UE device 130 via a signaling message (e.g., RRC message, etc.). In operation S5100, once the UE device 130 receives the valid system information and/or network configuration information, the UE device 130 accesses the wireless network via the RAN node 120.

Referring now to FIG. 6, a third transmission flow diagram is illustrated according to at least one example embodiment. In FIG. 6, similar to the at least one example embodiment of FIG. 5, and in contrast to the at least one example embodiment of FIG. 4, the UE device 130 has not been pre-configured to operate in an extended sleep cycle mode (e.g., an eDRX mode, etc.).

According to at least one example embodiment, in operation S6010, the RAN node 110, or an initial RAN node, may configure the UE device 130 to operate in an extended sleep cycle mode (e.g., eDRX mode, etc.) by transmitting extended sleep cycle information to the UE device 130. The extended sleep cycle information may be transmitted to the UE device 130 via a signaling message, etc.

In operation S6020, the RAN node 110 may transmit an extended sleep cycle configuration update message to the UE device 130 indicating that the system area identifier associated with the RAN node 110, e.g., area ID="1", is not applicable to the UE device 130. This network indication then causes the UE device 130 to not store the system information and/or system area identifier included in SIB messages received from the wireless network that include an area ID="1". In other example embodiments, the UE device 130 may receive an extended sleep cycle configuration update message instructing the UE device 130 to ignore all value tags included in SIB messages, etc., for similar effect.

In operation S6030, similar to operations S4010 of FIGS. 4 and S5020 of FIG. 5, the UE device 130 may select the initial RAN node 110, and may receive a SIB1 broadcast message from the RAN node 110. The SIB1 message may include system information and/or network configuration information associated with RAN node 110, a system area identifier associated with RAN node 110, and/or a value tag associated with the version number of the system information, etc. However, due to the network indication and/or extended sleep cycle update message received in operation S6020, in operation S6040, the UE device 130 does not store the system area identifier in memory. Then, in operation S6050, the UE device 130 enters into a sleep state for a desired time period based on the extended sleep cycle configuration information.

In operation S6060, the system information (and/or network configuration information) for system area 1, RAN node 110, and/or RAN node 120 may be changed. Optionally, in operation S6070, the UE device 130 may change locations from the initial cell of RAN node 110 to the current cell of RAN node 120, there may have been a handover operation between RAN node 110 and RAN node 120, etc., similar to operation S4040 and S5050 of FIGS. 4 and 5, respectively.

In operation S6080, the UE device 130 may wake up from the sleep state after the expiration of the duration of the sleep mode, similar to operations S4050 and S5060 of FIGS. 4 and 5, respectively, and the UE device 130 enters an active state in accordance with the extended sleep cycle configuration information. The UE device 130 then determines whether to acquire (and/or force acquisition) of a new/current cell based on the extended sleep cycle configuration information. However, due to the network indication received in operation S6030, the UE device 130 automatically determines to acquire (and/or force acquisition) of the new/current cell due to the initial system area identifier (and/or initial value tag) not being stored in memory in operation S6040.

In operation S6090, the UE device 130 may then acquire and/or force acquisition of the system information from a current cell (e.g., a new cell) by selecting the current cell that the UE device 130 is located within (e.g., RAN node 120). The selection of the current cell may further include the receiving of a cell identifier of the current cell from a PSS and/or SSS signal received from the current cell. According to some example embodiments, the cell selection operation may instead be a cell reselection operation, a reconfiguration with sync operation, and/or may occur due to a handover operation performed by a RAN node, etc. The selection of the current cell may further include the receiving of a cell identifier of the current cell from a PSS and/or SSS signal received from the current cell. Additionally, the UE device 130 may acquire a new SIB1 message from the current cell corresponding to RAN node 120. The new SIB1 message may include current system information from RAN node 120, a system area identifier corresponding to the system area of the current cell (e.g., cell 120A of RAN node 120), and/or a value tag indicating the version number of the current system information, etc., but the example embodiments are not limited thereto.

In optional operation S6100, the current RAN node 120 may transmit an extended sleep cycle configuration update message to the UE device 130 indicating that the system area identifier associated with the RAN node 110, e.g., area ID="1", is not applicable to the UE device 130, similar to the network indication transmitted by the initial RAN node 110 in operation S6020. Additionally, according to some example embodiments, operation S6020 may not be performed, while S6100 is performed.

According to at least one example embodiment, the network indication of operation S6100 then causes the UE device 130 to automatically determine that additional system information (e.g., network configuration information, etc.) is desired and/or required from the current RAN node 120. In operation S6120, the UE device 130 receives the periodic broadcast by the RAN node 120 of the additional system information messages, such as SIB2, SIB3, SIB4, etc., messages, which includes the additional system information and/or network configuration information. Additionally, in at least one other example embodiment, the UE device 130 may transmit a request to the RAN node 120 for the additional system information and/or network configuration information, and the RAN node 120 may then transmit the additional system information and/or network configuration information to the UE device 130 via a signaling message. In operation S6130, the UE device 130 accesses the wireless network via the RAN node 120 using the valid, current, and/or up-to-date system information and/or network configuration information.

While FIGS. 4 to 6 illustrate various methods for re-establishing connection and/or acquiring system information to a wireless network for a UE device operating in an extended sleep cycle mode, the example embodiments are not limited thereto, and other methods may be used to re-establish connection between a UE device operating in an extended sleep cycle mode and a RAN node.

Various example embodiments are directed towards a wireless network system including UE devices configured to operate in extended sleep cycle mode. Accordingly, one or more of the example embodiments provide a method for successfully establishing and/or re-establishing connection, and/or acquiring or re-acquiring system information, to a wireless network for a UE device operating in an extended sleep cycle mode that decreases the amount of network resource usage and network traffic transmitted by RAN nodes to UE devices configured to operate in extended sleep cycle mode in the wireless communication network, by decreasing and/or eliminating the usage of incorrect, invalid, out of date, and/or inapplicable system information.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A user equipment (UE) device comprising:
a memory storing instructions; and
at least one processor configured to execute the instructions to
cause the UE device to:
acquire first system information from a first cell, the first system information being applicable to a system information area,
receive extended sleep cycle configuration information from the first cell corresponding to an extended sleep cycle mode, and
determine whether to acquire second system information from a second cell distinct from the first cell based on the received extended sleep cycle configuration information, the second system information being applicable to the system information area,
wherein
the first system information includes a first system information area identifier of the system information area and a first value tag; and
the second system information includes,
a second system information area identifier matching the first system information area identifier, and
a second value tag matching the first value tag.

2. The UE device of claim 1, wherein the UE device is further caused to:
determine whether to acquire the second system information from the second cell by determining whether a system information area identifier is stored in the memory; and
acquire the second system information in response to the memory not storing any system information area identifier.

3. The UE device of claim 1, wherein the extended sleep cycle configuration information further causes the UE device to perform at least one of: not storing a first system information area identifier received from the first cell in the memory prior to entering a sleep state; and
deleting the first system information area identifier received from the first cell from the memory prior to entering the sleep state.

4. The UE device of claim 1, wherein the UE device is further caused to:
determine whether to acquire the second system information from the second cell by determining whether a value tag is stored in the memory; and
acquire the second system in formation in response to the memory not storing any value tag.

5. The UE device of claim 1, wherein the extended sleep cycle configuration information further causes the UE device to perform at least one of:
storing a first value tag received from the first cell in the memory prior to entering a sleep state; and
deleting the first value tag received from the first cell from the memory prior to entering a sleep state.

6. The UE device of claim 1, wherein the UE device is further caused to acquire the second system information from the second cell by at least one of:
receiving at least one second broadcast message from the second cell, the at least one second broadcast message including the second system information; and transmitting a request to the second cell for the second system information, and receiving the second system information from the second cell in response to the transmitted request.

7. The UE device of claim 1, wherein the extended sleep cycle mode is an extended discontinuous reception (eDRX) mode.

8. A radio access network (RAN) node comprising:
a memory storing instructions; and
at least one processor configured to execute the instructions to cause the RAN node to, transmit extended sleep cycle information corresponding to an extended sleep cycle mode to a user equipment (UE) device served by a first cell corresponding to the RAN node, wherein
the extended sleep cycle configuring information causes the UE device to, operate in a sleep state of the extended sleep cycle mode for a desired time period,
operate in an active state of the extended sleep cycle mode after expiration of the desired time period, and
acquire second system information from a second cell distinct from the first cell after the UE device is in active state,
wherein
the first cell is selected by the UE device prior to entering the sleep state; and the RAN node is further caused to:
transmit first system information to the UE device, the first system information being applicable to a system information area,
wherein
the first system information includes a first system information area identifier of the system information area and a first value tag;
the RAN node is further caused to,
transmit a first cell identifier to the UE device prior to the UE device entering the sleep state; and
the extended sleep cycle configuration information further causes the UE device to, receive a second cell identifier from the second cell after entering the active state, determine whether to acquire the second system information from the second cell by comparing the first and second cell identifiers, and acquire the second system information from the second cell in response to the first cell identifier not matching the second cell identifier.

9. The RAN node of claim 8, wherein
the first system information includes a first system information area identifier; and the extended sleep cycle configuration information further causes the UE device to:
determine whether to store the first system information area identifier in the UE device based on the extended sleep cycle configuration information,
determine whether to acquire the second system information from the second cell after entering the active state by determining whether a system information area identifier is stored in the UE device, and
acquire the second system information from the second cell in response to the UE device not storing any system information area identifier.

10. The RAN node of claim 8, wherein
the first system information includes a first system information area identifier; and the extended sleep cycle configuration information further causes the UE device to:
delete the first system information area identifier prior to entering the sleep state.

11. The RAN node of claim 8, wherein
the first system information includes a first value tag;
the extended sleep cycle configuration information further causes the UE device to:
determine whether to store the first value tag in the UE device based on the extended sleep cycle configuration information,
determine whether to acquire the second system information from the second cell after entering the active state by determining whether a value tag is stored in the UE device, and
acquire the second system information from the second cell in response to the UE device not storing any value tag.

12. The RAN node of claim 8, wherein
the first system information includes a first value tag; and
the extended sleep cycle configuration information further causes the UE device to:
delete the first value tag prior to entering the sleep state.

13. The RAN node of claim 8, wherein the extended sleep cycle mode is an extended discontinuous reception (eDRX) mode.

14. A method of operating a user equipment (UE) device, the method comprising, by the UE device:
acquiring first system information from a first cell, the first system information being applicable to a system information area;
receiving extended sleep cycle configuration information corresponding to an extended sleep cycle mode; and
determining whether to acquire second system information from a second cell based on the received extended sleep cycle configuration information, the second system information being applicable to the system information area,
wherein the extended sleep cycle configuration information further causes the UE device to perform at least one of: not storing a first system information area identifier received from the first cell in the memory prior to entering a sleep state and deleting the first system information area identifier received from the first cell from the memory prior to entering the sleep state.

* * * * *